United States Patent [19]

Denton

[11] 4,256,682

[45] Mar. 17, 1981

[54] METHOD OF PREPARING SILICA GEL PELLETS

[75] Inventor: Dean A. Denton, Baltimore, Md.

[73] Assignee: W. R. Grace & Co., New York, N.Y.

[21] Appl. No.: 127,274

[22] Filed: Mar. 5, 1980

[51] Int. Cl.$^3$ ............................................. B01J 2/22
[52] U.S. Cl. .................................. 264/109; 252/451; 423/338
[58] Field of Search ...................... 264/109; 252/451; 423/338

[56] References Cited

U.S. PATENT DOCUMENTS

| | | | |
|---|---|---|---|
| 3,453,077 | 7/1969 | Hyde | 252/451 |
| 3,650,989 | 3/1972 | Hindin et al. | 252/451 |
| 4,076,651 | 2/1978 | Jacques | 252/451 |
| 4,169,926 | 10/1979 | McDaniel | 252/451 |

OTHER PUBLICATIONS

Kagaku KK, Formed Silica Gel Carrier, Nov. 30, 1979, Central Patents Index, Classified Alerting Bulletin, Section: E36, Derwent Publications Ltd., London, England.

*Primary Examiner*—Donald E. Czaja
*Assistant Examiner*—James R. Hall
*Attorney, Agent, or Firm*—Mark T. Collins

[57] ABSTRACT

Silica gel pellets are prepared by mixing finely divided silica gel with an aqueous ammoniacal medium, compressing the mixture into pellets, and drying the pellets.

45 Claims, No Drawings

METHOD OF PREPARING SILICA GEL PELLETS

This invention relates to silica gel and, more particularly, to a method of preparing silica gel pellets.

Silica gel is used as a support for a variety of catalysts, such as olefin hydrogenation, polymerization, and other hydrocarbon conversion catalysts. The gel is used in fluid bed catalytic processes in the form of a finely divided powder which has a weight median particle diameter of from about 50 to about 200 microns. Ground silica granules and formed silica supports of from about 1/16 to about ¼ of an inch in diameter and about ⅛ to about ½ of an inch in length are used in fixed bed catalytic processes.

Formed silica supports are preferred over silica granules because they have greater physical strength, permit the incorporation of fines produced in silica gel manufacture and forming operations, and their size and shape can be controlled to enhance the flow of reactants and products through the reactor used in the catalytic process. Formed silica supports, such as cylindrical or spheroidal pellets, have previously been prepared by extrusion, oil drop gelation, and other conventional forming methods. Generally, such supports have been deficient in their resistance to the crushing and abrading forces encountered during catalyst manufacture and use. Catalyst fracture and attrition in use can result in significant decreases of catalytic activity due to loss of active catalytic components deposited on the support and reactant channeling.

In accordance with the method of this invention, silica gel pellets are prepared by mixing finely divided silica gel with an aqueous ammoniacal medium, compressing the mixture into pellets, and drying the pellets. The pellets have unexpectedly high average crush strengths and low attrition losses.

The silica gel used in the method of the present invention may be, for example, a silica xerogel or a silica aerogel. Preferably, the gel has a pore volume of at least about 0.9 cubic centimeter per gram and a water content of from about 1 to about 15 weight percent as measured by loss in weight after heating at 1750° F. (955° C.) for 1 hour. Silica xerogels, such as regular density and intermediate density gels, are usually used in the method. Regular density xerogels have extremely small pores and large surface areas. Intermediate density xerogels have lower surface areas and much larger average pore diameters and pore volumes than regular density xerogels. Intermediate density xerogels are preferred because they are more readily compressed in the method of this invention and their pore structure is especially suitable for many catalytic reactions in which pellets prepared by the method of this invention are used.

Generally, intermediate density silica xerogels have a surface area of from about 250 to about 400 square meters per gram, a pore volume of from about 0.9 to about 1.3 cubic centimeters per gram, an average pore diameter of about 80 to about 200 angstroms, and a packed bulk density of from about 0.30 to about 0.50 grams per cubic centimeter. The surface area and pore volume are determined by the adsorption method described in Brunauer, Emmet, and Teller, 60 *J. Am. Chem. Soc.* 309 (1933). The method is run to a $P/P_o$ of 0.967 so that pores of from 14 to 600 angstroms in diameter are measured. The average pore diameter in angstroms is calculated from the pore volume in cubic centimeters per gram and surface area in square meters per gram in accordance with the equation $$\text{average pore diameter} = \frac{4 \times \text{pore volume} \times 10^4}{\text{surface area}}.$$

The packed bulk density is determined by placing a given weight of the gel in a graduated cylinder. The cylinder is vibrated until all settling ceases and a constant volume is obtained. The weight of the gel occupying a unit volume is then calculated. Preferred intermediate density silica xerogels used in this invention have a pH of about 7 to about 10 as measured in a 5 weight percent aqueous slurry of the gel.

The silica gel used in the method of this invention may be prepared by conventional methods. Typically, silica hydrogel is prepared by mixing an aqueous alkali metal silicate solution, usually sodium silicate, and an aqueous mineral acid solution, usually sulfuric acid, to form a silica hydrosol and allowing the hydrosol to set to a hydrogel. The concentration of the acid solution is generally from about 5 to about 70 percent by weight and the aqueous silicate solution commonly has an $SiO_2$ content of about 6 to about 25 weight percent and a weight ratio of $SiO_2$ to $Na_2O$ of from about 1:1 to about 3.4:1. The reaction is generally carried out at temperatures of from about 15° to about 80° C. and typically is carried out at ambient temperatures.

The relative proportions and concentrations of the reactants are selected so that the hydrosol contains from about 5 to about 20 weight percent $SiO_2$ and has a pH of from about 1 to about 11. When the quantity of acid reacted with the silicate is such that the final pH of the reaction mixture is acidic, typically from about 1 to 5, the resulting product is considered an acid-set hydrogel. The hydrosol will set to a hydrogel mass in generally about 1 to about 90 minutes and the hydrogel mass is broken or cut up mechanically into granules in a particle size range of from about ½ to about 3 inches.

Generally, in the production of intermediate density gels, an acid-set hydrogel is aged or washed at a high pH and temperature. For example, the hydrogel granules may be mixed with water to yield a slurry having a silica content of about 6 to about 12 weight percent. Ammonium hydroxide is then added in an amount sufficient to raise the pH of the slurry above the neutral point, generally in the pH range of about 8 to about 10. The ammoniated slurry is then heated to about 170° to about 190° F. (77°–88° C.), typically about 180° F. (82° C.), for from about 1 to about 10 hours. Alternatively, the acid-set hydrogel granules may be washed with a base which is usually ammonium hydroxide or a substituted ammonia, such as a water-soluble amine. Preferably, the ammonium hydroxide has a pH of about 8 to about 10 and a temperature of about 40° to about 80° C. (104°–176° F.). The washing is continued for usually about 18 to about 40 hours and preferably for about 24 hours.

The hydrogel granules or ammoniated hydrogel granules are then washed with water or acidified water to remove residual alkali metal salts which are formed in the reaction. Acidified water is preferred and usually has a pH of from about 1.0 to about 5.0, preferably from about 2.5 to about 4.5. The acid may be a mineral acid such as sulfuric acid, hydrochloric acid, nitric acid, or phosphoric acid or a weaker acid such as formic acid, acetic acid, oxalic acid, citric acid, tartric acid, nitriloacetic acid, ethylene diamine-tetraacetic acid, or propionic acid. The water usually has a temperature of from about 80° to about 200° F. (27°–93° C.), preferably about 180° F. (82° C.). Generally, the hydrogel is washed for a period of from about 6 to about 30 hours.

The washed silica hydrogel generally has a water content, as measured by loss in weight after heating for 1 hour at 1750° F. (955° C.), of from about 60 to about 80 weight percent and a particle size ranging from about 1 micron to about 50 millimeters. The hydrogel is dried to the desired water content by conventional methods to produce silica xerogels and silica aerogels. Silica aerogels may be prepared by a drying step which avoids shrinkage of the silica structure, such as by rapid drying or by heating the hydrogel in the presence of an organic solvent to at least the critical temperature of the solvent and thereafter slowly releasing the solvent from the system. Oven drying, rotary drying, cascade drying, or some other known drying method may be employed to produce silica xerogels. For example, the drying may be accomplished in a forced draft oven at temperatures between about 130° to about 160° (266°–320° F.) for about 10 to about 20 hours. The hydrogel may be dried and then ground to the desired particle size in a hammer mill or fluid energy mill or it may be simultaneously dried and ground in a fluid energy mill using heating air or steam as the grinding fluid. Generally, the finely divided gel used in this invention has a weight median particle diameter of less than about 500 microns, preferably of from about 75 to about 250 microns.

The finely divided silica gel is mixed with an aqueous ammoniacal medium which generally has a pH of from about 10 to about 14. The aqueous ammoniacal medium preferably comprises an ammonium hydroxide solution. For example, ammonium hydroxide solutions containing from about 4 to about 35 weight percent ammonia may be used as the aqueous ammoniacal medium. Ammonium hydroxide solutions containing from about 20 to about 30 weight percent ammonia are preferably used as the aqueous ammoniacal medium.

The mixing of the finely divided silica gel and aqueous ammoniacal medium can be accomplished by any method which permits substantially complete and homogeneous dispersal and distribution between the solid and liquid phases. For example, the mixing may be conducted in a cement mixer at a speed of about 40 to about 80 revolutions per minute for a period of about 5 to about 15 minutes.

The relative amounts of the finely divided silica gel and the aqueous ammoniacal medium in the mixture are selected to provide a moldable mixture of such a consistency that it will cohere on compression and maintain its shape and dimensional integrity on standing. The consistency of the mixture depends on the porosity, pH, and particle size of the silica gel powder; the amount of the aqueous ammoniacal medium; and the degree of mixing. Generally, the components are mixed in a weight ratio of from about 0.20 to about 0.65, preferably from about 0.35 to about 0.55, parts of the aqueous ammoniacal medium to about one part of the silica gel powder, including the water present in the powder. These weight ratios provide an amount of water sufficient to produce a proper consistency for compression and an amount of base sufficient to produce substantial silica bonding in the mixture and pellets.

From about 1 to about 5 parts by weight of a lubricant per 100 parts by weight of the silica gel may be included in the mixture to reduce wear in the apparatus used to compress the mixture. The lubricant may be, for example, a hydrogenated cotton oil. The lubricant can be combined with the finely divided silica gel before or after mixing the gel with the aqueous ammoniacal medium.

The mixture is compressed or compacted to form pellets of adequate structural integrity to withstand the compressive forces and abrasions experienced in a fixed bed catalytic reactor without being crushed or reduced to fines that would reduce the efficiency of the reactor. Various compression molding methods that provide the necessary degree of compaction of the mixture may be employed in the method of this invention. Suitable apparatus that may be used to compress the mixture includes, for example, compactors, briquetters, extruders, hydraulic presses, rotary mold presses, and the like. The size and/or shape of the pellets can be adapted to suit the catalytic application. The pellets may be circular or polygonal (either regular or irregular) in cross-section and may vary in diameter from about 1/16 to about 5/16 of an inch and from about $\frac{1}{8}$ to about $\frac{1}{2}$ of an inch in length. Pellets of similar size may be prepared, for example, in the form of saddles, pillows, hollow cylinders, or doughnuts. The term pellets is intended to cover compacted articles prepared by this invention regardless of their shape, whether solid or with a hole therein, and regardless of the method of compacting and includes pellets, extrusions, tablets, briquettes, and other shapes which have been subjected to the requisite compacting. Preferably, the mixture is compressed to form solid, cylindrical pellets.

The crush strength of the pellets varies with the compaction pressure. Generally, the mixture is compressed under a pressure of at least about 1000 pounds per square inch to provide pellets of high average crush strengths. The upper limit of the compression pressure depends on the desired pore volume of the pellets. Crush strength is inversely proportional to pore volume. For example, a calcined pellet with a crush strength of 25 to 30 pounds will have a pore volume of 0.5 to 0.6 cubic centimeters per gram. A calcined pellet with a crush strength of 5 to 15 pounds will have a pore volume of 0.8 to 1.0 cubic centimeters per gram. Preferably, the pressure is from about 2000 to about 10,000 pounds per square inch to produce pellets having an average crush strength of at least about 30 pounds and a pore volume of at least about 0.55 cubic centimeters per gram.

Preferably, the pellets are formed on a mold or tablet press, such as a rotary mold or tablet press. Suitable presses are available from F. J. Stokes Corporation, Philadelphia, Pa. and are described in U.S. Pat. Nos. 2,846,723; 2,944,493; 2,989,781; 3,266,677; and 3,408,963. Generally, a rotary press employs a rotating head which includes opposing pairs of punches and a die disposed between each pair of punches. The punches cooperate and oppose each other in the die to form pelleted or tabletted products between their adjacent ends as the punches are passed between upper and lower pressure rolls.

The operation of the press commences in a fill position in which the upper punch is completely withdrawn from the die cavity and the lower punch is depressed toward the bottom of the die cavity. The mixture to be molded is fed from a hopper and flows downwardly into a feed frame which scoops the mixture into the die cavity as the die passes under the feed frame. As the operation progresses, the upper punch is lowered into the die cavity and closes the upper end of the die cavity. When the opposing punches pass between the upper and lower pressure rolls, the upper punch is pressed downwardly into the die cavity and the lower punch is pressed upwardly to compress the mixture in the die cavity. As the head continues to rotate carrying the punches past the pressure rolls, the upper punches are drawn clear of the dies and at the same time the lower punches are raised to level their upper ends with the upper surface of the die holes and eject the pellets. The amount of compaction pressure is determined by the volume of the mixture in the die cavity which is controlled by the depth of the lower punches in the cavity of each die and the setting of the pressure rolls.

The pellets have sufficient green strength to retain their shapes and to be subjected to mechanical handling in further processing without distortion. Aging may be employed to decrease the surface area of the pellets if pellets of a lower surface area of about 60 to about 150 square meters per gram are desired for the particular catalyst support application. The pellets may be aged by placing them in a closed container to preclude moisture evaporation and allowing the pellets to stand undisturbed. The period of aging may generally be at least about 1 hour and preferably is from about 24 to about 175 hours. Aging decreases the pellet surface area without substantially changing the crush strength and pore volume of the pellets so that surface area can be varied independently of crush strength and pore volume. For example, aging for about 168 hours of pellets formed from intermediate density silica gel powders produces pellets having a surface area of from about 90 to about 110 square meters per gram. If the pellets are not aged but are dried and/or calcined immediately after forming, the pellets generally have a surface area of greater than 175 square meters per gram, for example, of from about 200 to about 250 square meters per gram.

After forming or after aging, the pellets are dried by conventional methods. For example, the pellets may be dried in a rotary dryer, cascade dryer, forced draft oven dryer, or other conventional dryer. Generally, the pellets are dried at a temperature of from about 90° to about 250° C. (194°-482° F.) for a period of from about ½ to about 6 hours. Drying increases the mechanical strength of the pellets and their resistance to deformation in subsequent handling. Ammonia gas is given off during drying.

If a lubricant is included in the mixture of silica gel and aqueous ammoniacal medium or if desired for the particular application, the dried pellets may be calcined at a temperature of at least about 1000° F. (538° C.) for about ½ to about 4 hours.

The pellets prepared by the method of this invention may be used as desiccants to adsorb moisture in the drying of gases and liquids and are particularly suitable for use as a catalyst support. The catalytic agent may be included in the silica hydrogel or may be impregnated on the dried or calcined pellets. The catalytic agent is selected for the particular fixed bed catalytic process in which the catalyst will be used. Typical catalysts employing the support prepared by this invention include ethylene hydrogenation catalysts employing ferric chloride or cobalt oxide as the catalytic agent.

The present invention is further illustrated by the following examples.

EXAMPLE 1

10,000 grams of an intermediate density silica xerogel having a particle size distribution of from 74 to 250 microns, a weight median particle diameter of 150 microns, a surface area of 300 square meters per gram, a pore volume of 1.0 cubic centimeters per gram, a packed bulk density of 0.32 grams per cubic centimeter, and a water content of 2 weight percent were mixed in a cement mixer with 5000 milliliters of a 28 weight percent ammonium hydroxide solution for a period of 10 minutes at a rate of 60 revolutions per minute. The resulting powder was then formed into cylindrical pellets in a rotary press of F. J. Stokes and Company, Philadelphia, Pa. The cylindrical pellets were 3/16 inch in diameter and 3/16 inch in length. The pellets were dried immediately in a forced air dryer at a temperature of 200° F. (93° C.) for a period of 5 hours. The properties of the dried pellets are shown in Table I.

TABLE I

| | |
|---|---|
| surface area (m²/g) | 200 |
| pore volume (cm³/g) | 0.80 |
| average crush strength (lbs.) | 13 |

The crush strength was determined by placing the pellet between the parallel plates of a testing machine and slowly bringing the plates together by hand pressure. The amount of force required to crush the particles registered on a dial which had been calibrated in pounds. A sufficient number, for example, 50, of the particles was crushed in order to obtain a statistically significant estimate for the total population. The average crush strength was calculated from the individual results.

EXAMPLE 2

Silica gel pellets were prepared in accordance with the procedure of Example 1 except that the pellets were aged for 168 hours in a closed container. The dried pellets had the properties shown in Table II.

TABLE II

| | |
|---|---|
| surface area (m²/g) | 90 |
| pore volume (cm³/g) | 0.80 |
| average crush strength (lbs.) | 13 |

EXAMPLE 3

Silica gel pellets were prepared in accordance with the procedure of Example 1 except that 500 grams of a Sterotex hydrogenated cotton oil lubricant were added to the silica gel before mixing with the ammonium hydroxide and the dried pellets were calcined in air at 1000° F. (538° C.) for 4 hours. The properties of the calcined pellets are shown in Table III.

| | |
|---|---|
| surface area (m²/g) | 200 |
| pore volume (cm³/g) | 0.80 |
| average crush strength (lbs.) | 13 |

The inclusion of the lubricant did not change the properties of the calcined pellets.

EXAMPLE 4

Silica gel pellets were prepared in accordance with the procedure of Example 1 except that the feed rate was adjusted to maximize the compaction pressure. The properties of the pellets after drying at 400° F. (204° C.) for 1 hour are shown in Table IV.

TABLE IV

| | |
|---|---|
| surface area (m²/g) | 150 |
| pore volume (cm³/g) | 0.55 |
| average crush strength (lbs.) | 35 |

What is claimed is:

1. A method of preparing silica gel pellets comprising mixing a finely divided silica gel with an aqueous ammoniacal medium in amounts sufficient to provide a moldable mixture, compressing the mixture into pellets, and drying the pellets.

2. The method of claim 1 in which from about 0.35 to about 0.55 parts by weight of the aqueous ammoniacal medium are mixed with about one part by weight of the silica gel.

3. The method of claim 1 in which the silica gel has a weight median particle diameter of less than about 500 microns.

4. The method of claim 1 in which the silica gel has a weight median particle diameter of from about 75 to about 250 microns.

5. The method of claim 1 in which the silica gel has a pore volume of at least about 0.9 cubic centimeters per gram.

6. The method of claim 1 in which the silica gel has a water content of from about 1 to about 15 weight percent.

7. The method of claim 1 in which the silica gel is a silica aerogel.

8. The method of claim 1 in which the silica gel is a silica xerogel.

9. The method of claim 1 in which the silica gel is an intermediate density silica xerogel.

10. The method of claim 1 in which the silica gel has an average pore diameter of from about 80 to about 200 angstroms.

11. The method of claim 1 in which the silica gel has a surface area of from about 250 to about 400 square meters per gram.

12. The method of claim 1 in which the silica gel has a packed bulk density of from about 0.30 to about 0.50 grams per cubic centimeter.

13. The method of claim 1 in which the silica gel has a pH of from about 7 to about 10 prior to contact with the ammoniacal medium.

14. The method of claim 1 in which the aqueous ammoniacal medium has a pH of from about 10 to about 14.

15. The method of claim 1 in which the aqueous ammoniacal medium comprises an ammonium hydroxide solution.

16. The method of claim 15 in which the solution contains from about 20 to about 30 weight percent ammonia.

17. The method of claim 1 in which the mixture is compressed under a pressure of at least about 1000 pounds per square inch.

18. The method of claim 1 in which the mixture is compressed under a pressure of from about 2,000 to about 10,000 pounds per square inch.

19. The method of claim 1 in which the mixture is compressed in a rotary press.

20. The method of claim 1 in which the mixture is compressed to form solid, cylindrical pellets.

21. The method of claim 1 in which the pellets are dried at a temperature of from about 90° to about 250° C. for from about ½ to about 6 hours.

22. The method of claim 1 further comprising calcining the pellets.

23. The method of claim 22 in which the mixture further comprises a lubricant.

24. The method of claim 23 in which the pellets are calcined at a temperature of at least about 538° C. for from about ½ to about 4 hours.

25. The method of claim 1 further comprising aging the pellets for at least about 1 hour prior to drying.

26. The method of claim 25 in which the pellets are aged for from about 24 to about 175 hours.

27. A method of preparing silica gel pellets comprising mixing from about 0.35 to about 0.55 parts by weight of an ammonium hydroxide solution having a pH of from about 10 to about 14 and about 1 part by weight of an intermediate density silica xerogel having a weight median particle diameter of less than about 500 microns, compressing the mixture into solid cylindrical pellets under a pressure of at least about 1000 pounds per square inch, and drying the pellets.

28. The method of claim 27 in which the silica xerogel has a weight median particle diameter of from about 75 to about 250 microns.

29. The method of claim 27 in which the silica xerogel has a pore volume of at least about 0.9 cubic centimeters per gram.

30. The method of claim 27 in which the silica xerogel has an average pore diameter of from about 80 to about 200 angstroms.

31. The method of claim 27 in which the silica xerogel has a surface area of from about 250 to about 400 square meters per gram.

32. The method of claim 27 in which the silica xerogel has a packed bulk density of from about 0.30 to about 0.50 grams per cubic centimeter.

33. The method of claim 27 in which the silica xerogel has a pH of from about 7 to about 10 prior to contact with the ammoniacal medium.

34. The method of claim 27 in which the solution contains from about 20 to about 30 weight percent ammonia.

35. The method of claim 27 in which the mixture is compressed under a pressure of from about 2,000 to about 10,000 pounds per square inch.

36. The method of claim 27 in which the mixture is compressed in a rotary press.

37. The method of claim 27 in which the pellets are dried at a temperature of from about 90° to about 250° C. for from about ½ to about 6 hours.

38. The method of claim 27 further comprising calcining the pellets.

39. The method of claim 38 in which the mixture further comprises a lubricant.

40. The method of claim 39 in which the pellets are calcined at a temperature of at least about 538° C. for about ½ to about 4 hours.

41. The method of claim 27 further comprising aging the pellets for at least about 1 hour prior to drying.

42. The method of claim 41 in which the pellets are aged for from about 24 to about 175 hours.

43. The method of claim 1 in which from about 0.20 to about 0.65 parts by weight of the aqueous ammoniacal medium are mixed with about one part by weight of the silica gel.

44. The method of claim 1 in which the silica gel has a pore volume of from about 0.9 to about 1.3 cubic centimeters per gram.

45. The method of claim 27 in which the silica xerogel has a pore volume of from about 0.9 to about 1.3 cubic centimeters per gram.

* * * * *